June 17, 1952  F. P. ZWICK  2,600,824
CRANKSHAFT GRINDER
Filed Oct. 14, 1949

INVENTOR.
FREDERICK P. ZWICK
BY
Reynolds & Beach
ATTORNEYS

Patented June 17, 1952

2,600,824

UNITED STATES PATENT OFFICE 2,600,824

CRANKSHAFT GRINDER

Frederick P. Zwick, Seattle, Wash.

Application October 14, 1949, Serial No. 121,407

4 Claims. (Cl. 51—237)

In the grinding of crankshafts it is customary to set up the shaft to be ground with its main bearing axis initially substantially coincident with a fixed rotative axis, and then to offset the crankshaft bodily, radially of such axis in the direction and by the length of a selected crank throw or series thereof, until the crankpins of the selected series are, at least theoretically, coaxial with the axis of rotation, and finally by rotating the crank-shaft bodily about such axis to grind the selected crankpin or pins.

It is a simple matter to effect the desired throw or radial adjustment with acceptable accuracy. It is quite another matter to effect, with the desired accuracy and quickly enough, what is called the trim adjustment. It will be realized that if the crank throw being offset does not correspond precisely in direction with the line joining the main bearing axis and its crankpin axis, the latter, upon completion of the throw adjustment, will lie at one side or the other of the line of adjustment. Now, when the crankshaft is rotated bodily about the axis of rotation, the lack of coincidence between this axis of rotation and the crankpin axis will be magnified until a difference or departure by as little as one thousandth of an inch will require the grinding away of at least two thousandths of an inch from one side of the crankpin and no material from its opposite side, in order that the crankpin shall be round and true. Even so small a change is undesirable, for it will unbalance the crankshaft and disturb the smoothness of the engine. The departure will ordinarily be considerably in excess of one-thousandth of an inch, and since it is preferred that no more than ten-thousandths of an inch of metal in all be removed from any given crankpin, and that this be removed evenly round about the same, it is obvious that a rather high degree of accuracy is required in effecting coincidence between the axis of the selected crankpin and the axis of rotation.

It has been recognized heretofore that such a high degree of accuracy in the trim adjustment is desirable, and provisions have been made heretofore to effect the final trim adjustment by small increments, with the intention of achieving a high degree of accuracy, but by methods and by mechanism which, because of focusing attention upon the minuteness of the trim adjustment, have lost sight of the fact that in achieving minuteness of trim adjustment the accuracy of the throw adjustment must not be interfered with. In such devices of which I am aware, as heretofore proposed, in attempting to achieve a high degree of accuracy in the trim adjustment, the accuracy in the throw adjustment has been destroyed, without compensation, hence the same difficulty remains, that the crankpin is somewhat eccentric of the axis of rotation, and a considerably larger amount of metal must be removed in the grinding operation merely to restore accuracy than should be required were the crankpin accurately located both in trim and for throw.

Accordingly, it is one of the objects of this invention to provide mechanism and a method whereby by readjustment of the relationship of the parts involved, the trim adjustment may be made accurately and minutely after the throw adjustment has been accurately attained, without the possibility of disturbing the accuracy of the throw adjustment.

The adjusting means of the known type referred to above have not come into widespread use, because their accuracy-destroying characteristics have been recognized but instead it has been customary to loosen the shaft in its chuck or other gripping and rotative driving means, in order to effect the final trim adjustment. This is undesirable from the standpoint that such loosening of the shaft involves the possibility, indeed, the likelihood, of disturbing the previously attained accuracy in the throw adjustment, but in addition it involves the necessity of attempting the manipulation simultaneously of four different securing screws, two at the head stock and two at the tail stock of the grinder, which is awkward, and in addition it entails an appreciable loss of time.

A further object of the present invention is to provide for such trim adjustment by means which do not involve the loosening of the rigid grip upon the crankshaft, and by means which are only two in number, readily accessible to the operator standing in front of the grinder, which are considerably less awkward to manipulate, and which will involve a very appreciable saving of time and effort, to an extent which will permit the grinding of at least two additional crankshafts, with improvements in accuracy and with a lessening of labor, in a day's time.

It is a still further object of the invention to provide mechanism of the nature generally indicated above, in a form which is capable of application to standard grinders without the necessity of any machine work upon or adaptation to the grinder itself, the only manufacturing operations required being those upon the simple appliances to the standard grinder, and their mounting thereupon through the medium of bolt holes readily provided upon the grinder.

In the accompanying drawings the invention is shown, by way of example, applied to a grinder of the general type disclosed in the Belden et al. Patent No. 2,404,613, dated July 26, 1946, or in the Healey Patent No. 2,447,334, of August 17, 1948. The principles of this invention and the features wherein it distinguishes over the devices referred to above, will be understood more fully as this specification progresses, and from a study of the appended claims, and will become more apparent by reference to the drawings which form a part of this application.

Figure 1:
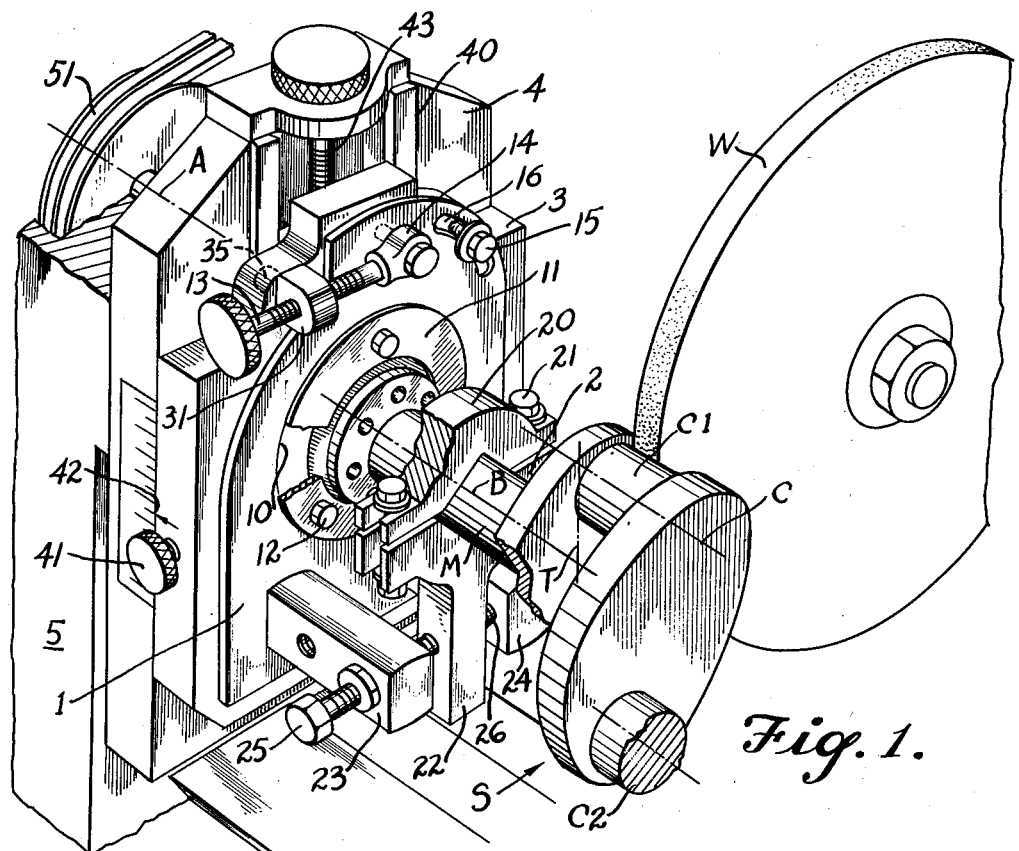
Figure 1 is an isometric view of a grinder headstock and the grinding wheel, shown in operative relationship to effect grinding of a crankpin, and incorporating the novel features of this invention.
Figure 2:
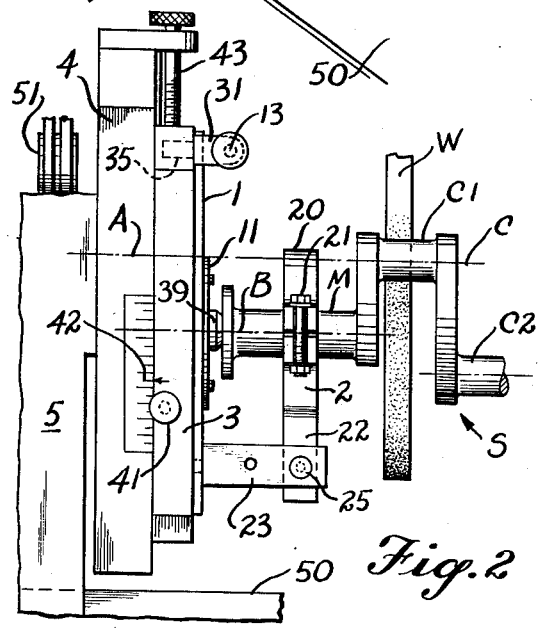
Figure 2 is a front elevational view of the same.

As in the patents referred to above, the complete grinder would incorporate a bed, along which are shiftable two workheads, a headstock and a tailstock, to present in turn each bearing of a crankshaft supported between the workheads to a rotative grinding wheel fixedly located. Each workhead will incorporate an upright post which is shiftable lengthwise of the bed, supporting a rotative workhead, a cross slide adjustable diametrically upon and rotative with the workhead, whereby throw adjustment is accomplished, and a means for gripping the shaft adjacent its ends and driving it rotatively as the workhead and its cross slide rotates. A trim-adjusting means is interposed between the shaft-gripping and driving means and the cross slide that supports the latter. There is such a trim-adjusting element in the Belden patent, but in distinction to the present invention, wherein the trim-adjusting element is mounted for trim adjustment concentrically about an axis of adjustment which coincides with the main bearing axis of the crankshaft, the adjustment in Belden is accomplished about an axis which is offset appreciably from the axis of the main bearing of the crankshaft, with the result that any trim adjustment unavoidably effects also some degree of throw adjustment. However, the manner of effecting trim adjustment according to this invention, and the mechanism whereby the same is accomplished, will become clearer by reference to the details of structure shown in the drawing herein, and so, too, will the advantages of the present invention become clearer by reference to the illustrative structure herein shown.

In the drawings only the headstock is shown, but it is to be understood that the tailstock may well be and ordinarily would be of substantially the same form and construction, save only that it is not power-driven. A crankshaft S, which is to be ground, is supported by its ends, one end by the headstock and the other end by the tailstock. Various means of supporting and centering the crankshaft initially are employed by different operators, that illustrated being a support on centers 39. The machine at each end of the shaft comprises a post 5 upstanding from and slidable lengthwise of a bed 50, the post at the headstock supporting rotative drive means intended to be suggested or indicated at 51. By these means a rotative workhead 4 is rotatable upon a fixed axis, indicated at A. This rotative workhead 4, which may be suitably counterweighted as may be required by circumstances (which counterweight has been omitted in the drawings for greater clarity) is provided with guides 40 extending diametrally, on which is slidable a cross slide 3. A screw 43 or the like effects coarse adjustment of the cross slide 3 diametrally with respect to the axis A, and a scale or gauge at 42 indicates the amount of such adjustment. It is unlikely that this coarse adjustment will equal precisely the throw of the crankpins of the crankshaft which is being ground, hence provision is normally made, as indicated at 41, for fine adjustment to obtain accuracy in the throw adjustment to the fraction of a thousandth of an inch.

The shaft S, centered at 39, is gripped in V-blocks 2 and 20, clamped together by the screws 21, about some portion of the shaft adjacent its end which is concentric with the shaft's main bearing axis B. One of the V-block elements, for instance the block 2, is provided with a driving dog 22 which projects radially. This driving dog must be connected to the rotative workhead 4, though indirectly, in order that the crankshaft may be rotated when the workhead rotates.

Such connection for rotating the shaft consists conveniently of the drivers 23 and 24 located at opposite sides of the dog 22, and the screws 25 and 26 threaded in the respective drivers, which engage the opposite sides of the dog 22 and secure it and the shaft gripped thereby firmly against any angular movement except such as is caused by angular movement of the dog itself. The drivers 23 and 24, rather than being mounted in the cross slide 3 as heretofore, are mounted in an element in the nature of a plate 1 which is rotatively mounted upon the cross slide 3 to rotate about the main bearing axis B of the crankshaft S. To this end the plate 1 has a shouldered aperture 10 and is held for rotation only upon the cross slide 3 by means of a retaining collar 11 secured by bolts 12, which are threaded into the cross slide 11. The cross slide comes provided with such holes, for the support of a chuck, normally.

In order to effect rotative adjustment of the element 1 relative to the cross slide 3, which adjustment effects trim adjustment of the shaft S, an adjusting screw 13 is threaded in a nut 31 which is carried by and rockable at 35 upon the cross slide 3, and one end of the adjusting screw 13 is swiveled in a head 14 which is carried by the plate 1. A scale is not necessary nor ordinarily used in effecting the trim adjustment, since accuracy is ordinarily determined by a contact or dial gauge pressed against the crankpin, as C1, to be ground, but a scale could be employed if desired. In order to secure parts in accurately adjusted position, and to relieve the adjusting screw 13 of the strain of holding such parts thus accurately, a clamping screw 15 is provided, passing through an arcuate slot 16 in the element 1 and threaded into a hole which is normally provided in the cross slide 3.

Figure 3:
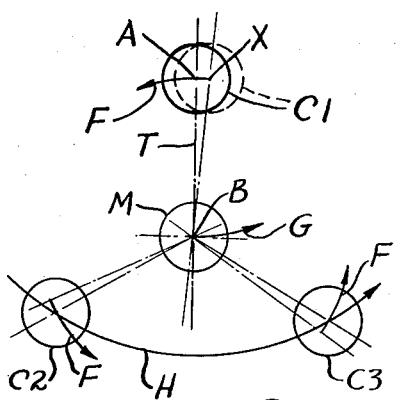
Figure 3 is a diagrammatic view illustrating the operation of effecting the trim adjustment in accordance with the principles of this invention, and its effect on the accuracy of the subsequent grinding of a crankpin.

Initially, the shaft S is set up in the grinder with its main bearings M having their axis B substantially coaxial with the axis of rotation A. In setting up no adjustment is necessary other than that which may be accomplished by the adjusting screw 43, or by adjusting the position of the V-blocks 2, 20 with relation to the drivers 23 and 24. The crankpins, C1, C2, C3, are ordinarily grouped in series at 120° angular spacing about the axis B of the main bearings. Accordingly, in order to grind them, it is necessary to bring each crankpin, or each series wherein all are coaxial, in turn into axial alignment with the axis of rotation A. Assume that it is intended to grind the crankpin C1, the axis whereof is shown at C. Assuming its throw T is parallel to the guide 40 whereon the cross slide 3 moves, the cross slide is offset from the axis of rotation A by the distance equivalent to the throw T by operation of the screw 43, aided by the final throw adjustment at 41. The adjustment of throw can be completed very accurately and rather quickly. However, it may be that the crankshaft was so set up that the throw T of the crankpin C1 was not precisely parallel to the slide 40, but rather at a slight angle relative thereto. In such a case, the axis C1, upon completion of the throw adjustment, is located at the point X (see Figure 3) which is offset by some slight amount to one side of the axis A, which is fixed. In order to effect coincidence between the axis C and the axis A the crankpin C1 must be displaced by the slight amount of departure of its axis C from the axis A. This has been effected heretofore by slacking off in turn each of the four screws 21, two at the headstock and two at the tailstock, rotating the entire shaft S about its main bearing axis B until the axis C is brought into agreement with the axis A, and then retightening each individual screw 21. It is obvious that this is very likely to destroy the accuracy of the throw adjustment previously made, and to require further adjustment of the throw to restore its accuracy. Seldom was this checked after the completion of the trim adjustment, and if done would add additional time to an already time-consuming operation. Consequently, in accordance with the present invention the clamping screws 21 are not slacked off, but instead the element 1 is rotated relatively to the cross slide 3 by means of the adjusting screw 13, and thereby the entire shaft is finely adjusted about its main bearing axis B (offset though it may be from the rotative axis A) in the manner shown by the arrows F, until X (or C) and A precisely coincide. Because the adjustment is made about the main bearing axis B, there is no chordal or radial departure of the point X from the point A, as there would be if adjustment were made about some other center than B, and as a result the trim adjustment is accomplished wholly accurately, yet without disturbance of the accuracy of the throw adjustment.

Determination of the coincidence between the axes X and A may be accomplished by application of a contact or dial gauge to the crankpin C while turning it over from side to side. Such adjustment will at the same time adjust the other crankpins into approximately correct adjustment for trim, although it is best to check each crankpin or series thereof for accuracy of trim adjustment notwithstanding that the preceding trim adjustment has been accurate.

Now, with the trim adjustment accurately accomplished the two rotative workheads at the headstock and tailstock, respectively, are rotated, or caused to revolve about the axis A; the main bearing axis B rotates in the orbit G, and the other two crankpins about the orbit H. This enables the crankpin C1, rotating about its axis C, which coincides with the axis A, to be ground by the grinding wheel W with the greatest of accuracy. It is in a situation such as this that the counterweight referred to previously would ordinarily be employed to balance the offset mass of the crankshaft as a whole.

The essence of the present invention lies in effecting trim adjustment about the main bearing axis B, rather than about some other axis, all the while the crankshaft remains securely supported and accurately located, as to throw adjustment, and doing this by two, only, conveniently located adjusting means at 31, one engaged by each hand of the operator for simultaneous, conjoint, and equal adjustment.

I claim as my invention:

1. In a crankshaft grinder, in combination with a workhead rotative about a fixed axis; a cross slide carried by, rotative with, and adjustable diametrally with respect to, said workhead; an element rotative with and supported on said cross slide for rotative adjustment relative to the cross slide about an axis which coincides with or is parallel to the workhead's axis of rotation, depending upon the diametrally adjusted position of the cross slide; means carried by said rotative element for securing one end of a crankshaft immovably with respect to said element, coaxially of the axis of adjustment thereof, with its several crankpins angularly spaced about such axis of adjustment, and for adjustment and rotation with said element; means to effect diametral adjustment of said cross slide relative to said workhead, along the general line of any selected crank throw, to offset the crankshaft's axis relative to the axis of rotation by the amount of the throw, and to dispose the axis of the selected crankpin approximately coaxial with the axis of rotation, and to secure the cross slide in such diametrally adjusted position; an adjusting screw disposed chordally of said rotative element and a nut threaded on said screw, one thereof being mounted upon the rotative element and the other upon the cross slide; and means engageable to effect rotation of said screw, whereby to adjust the rotative element minutely angularly about its axis of adjustment, to bring the axis of the selected crankpin into coincidence with the axis of rotation, and to retain it in such position of adjustment.

2. A crankshaft grinder as in claim 1, wherein by adjustment of the workhead the adjusting screw may be disposed generally horizontally, and wherein the means to effect rotation of said screw is formed as a rotating head fixed upon that end of the screw which is disposed at the forward side of the grinder when the screw is thus horizontally disposed.

3. In a crankshaft grinder, in combination with a workhead rotative about a fixed axis; a cross slide carried by, rotative with, and adjustable diametrally with respect to, said workhead; a centrally apertured plate, the cross slide being similarly apertured; a retaining and bearing collar secured upon the cross slide and overlying the inner margin of the plate to retain the latter, and to guide it for rotative adjustment relative to the cross slide about an axis which coincides with or is parallel to the workhead's axis of rotation, depending upon the diametrally adjusted position of the cross slide; means carried by said plate for securing one end of a crankshaft immovably with respect to the plate, coaxially of the axis of adjustment thereof, with its several crankpins spaced angularly about such axis of adjustment, and for adjustment and rotation with said plate; means to effect diametral adjustment of said cross slide relative to said workhead, along the line of any selected crank throw, to offset the crankshaft's axis relative to the axis of rotation by the amount of the throw, and to dispose the axis of the selected crankpin approximately coaxial with the axis of rotation, and to secure said cross slide in such diametrally adjusted position; and adjusting means interacting between said rotatively adjustable plate and said cross slide to adjust the plate minutely angularly about its axis of adjustment, to bring the axis of the selected, approximately coaxial crankpin into coincidence with the axis of rotation, and to retain it in such position of adjustment.

4. An attachment for a crankshaft grinder such as includes a rotative workhead and a cross slide mounted upon and adjustable diametrally of said workhead, said attachment comprising a centrally apertured plate, a retaining and bearing collar overlying the plate when in operative position, means to secure the collar to the cross slide, and thereby to secure said plate upon and for rotative adjustment relative to the cross slide, means on said plate to engage and rotate a crankshaft which is supported upon the cross slide, and adjusting means mounted upon said plate, and for securement to the cross slide, by reaction therebetween to effect rotative adjustment of the plate and the crankshaft engaged thereby, relative to the cross slide.

FREDERICK P. ZWICK.

REFERENCES CITED

The following references are of record in the file of this patent:

UNITED STATES PATENTS

| Number | Name | Date |
|---|---|---|
| 643,172 | Tindel et al. | Feb. 13, 1900 |
| 1,660,291 | Birkigt | Feb. 21, 1928 |
| 2,404,613 | Belden et al. | July 23, 1946 |
| 2,447,334 | Healy | Aug. 17, 1948 |